(12) United States Patent
Sonntag et al.

(10) Patent No.: US 12,708,969 B2
(45) Date of Patent: Aug. 18, 2026

(54) DRILLING TOOL

(71) Applicant: Robert Bosch GmbH, Stuttgart (DE)

(72) Inventors: Stefan Sonntag, Vogt (DE); Rainer Widmann, Bodnegg (DE); Andreas Schurig, Lyss (CH); Alexander Volz, Baienfurt (DE); Tamara Gaschler, Ravensburg (DE)

(73) Assignee: Robert Bosch GmbH, Stuttgart (DE)

(*) Notice: Subject to any disclaimer, the term of this patent is extended or adjusted under 35 U.S.C. 154(b) by 392 days.

(21) Appl. No.: 18/556,933

(22) PCT Filed: Apr. 27, 2022

(86) PCT No.: PCT/EP2022/061220
§ 371 (c)(1),
(2) Date: Oct. 24, 2023

(87) PCT Pub. No.: WO2022/233678
PCT Pub. Date: Nov. 10, 2022

(65) Prior Publication Data

US 2024/0207992 A1 Jun. 27, 2024

(30) Foreign Application Priority Data

May 6, 2021 (DE) ..................... 10 2021 204 594.4

(51) Int. Cl.
*B23Q 11/00* (2006.01)
*B23B 45/00* (2006.01)

(52) U.S. Cl.
CPC ........ *B23Q 11/0046* (2013.01); *B23B 45/003* (2013.01)

(58) Field of Classification Search
CPC ... B23Q 11/0046; B23B 45/003; E21B 7/003; E21B 11/005; E21B 21/011
See application file for complete search history.

(56) References Cited

U.S. PATENT DOCUMENTS 10,005,138 B2 * 6/2018 Best ........................ B23B 51/06
2009/0269152 A1 * 10/2009 Edwards ............ B23Q 11/0046
408/205

(Continued)

FOREIGN PATENT DOCUMENTS

DE 26 45 693 A1 4/1978
DE 31 31 794 A1 5/1982

(Continued)

OTHER PUBLICATIONS

International Search Report corresponding to PCT Application No. PCT/EP2022/061220, mailed Sep. 7, 2022 (German and English language document) (6 pages).

*Primary Examiner* — Shane Bomar
(74) *Attorney, Agent, or Firm* — Maginot, Moore & Beck LLP

(57) ABSTRACT

A drilling tool, in particular a rock drill, extends along a longitudinal axis and includes a drill head, an insertion end, a main body, a cover element, a transport region which is located between the drill head and the insertion end, and at least one transport channel which extends along the transport region. The transport channel is located radially between the cover element and the main body. The cover element includes at least one interior region, which is located inside the main body, and at least one exterior region which is located outside the main body.

16 Claims, 7 Drawing Sheets

(56) References Cited

U.S. PATENT DOCUMENTS

| | | | | |
|---|---|---|---|---|
| 2012/0285749 | A1* | 11/2012 | Bohn | B23B 51/06<br>76/108.1 |
| 2021/0331350 | A1* | 10/2021 | Sonntag | B28D 7/02 |
| 2022/0355430 | A1* | 11/2022 | Eckel | B23Q 11/0071 |

FOREIGN PATENT DOCUMENTS

| | | | |
|---|---|---|---|
| DE | 32 37 721 | A1 | 4/1984 |
| DE | 85 06 915 | U1 | 5/1985 |
| DE | 10 2011 075 769 | A1 | 11/2012 |
| DE | 10 2017 219 439 | A1 | 5/2019 |
| DE | 20 2018 106 720 | U1 | 4/2020 |
| EP | 2 522 447 | A1 | 11/2012 |
| WO | 2019/214950 | A1 | 11/2019 |

* cited by examiner 400
200
300
302
402
10
14
12

Fig. 1c

DRILLING TOOL

This application is a 35 U.S.C. § 371 National Stage Application of PCT/EP2022/061220, filed on Apr. 27, 2022, which claims the benefit of priority to Serial No. DE 10 2021 204 594.4, filed on May 6, 2021 in Germany, the disclosures of which are incorporated herein by reference in their entirety.

BACKGROUND

DE 3237721 A1 describes a rock drill used for drill debris removal, the rock drill comprising a drill shaft having a longitudinal central bore. In order to create channels for the incoming air and the exhaust air, the drill shaft comprises a shroud, so that a free space or cavity results, through which the drilling dust can be suctioned away.

SUMMARY

The disclosure relates to a drilling tool, in particular a rock drill, which extends along a longitudinal axis and comprises a drill head, an insertion end, a main body, a cover element, and a transport region which is located between the drill head and the insertion end, and at least one transport channel which extends along the transport region, said transport channel being located radially between the cover element and the main body. It is proposed that the cover element comprises at least one exterior region which is located outside the main body. It is further conceivable that the cover element comprises at least one interior region which is located inside the main body. Advantageously, the shape of the drill hole adjacent the drill head via the cover element can thus be adjusted, thereby enabling a round drill hole shape to be achieved.

The drilling tool is in particular designed as a rock drill provided for a hammer drill. At its end facing away from the drill head, the drilling tool comprises the insertion end designed to be coupled to a hand-held tool machine, e.g., a hammer drill. Preferably, the drilling tool in the region of the insertion end is designed such that the drilling tool is couplable to a tool receptacle of the hand-held tool machine. The drilling tool in the region of the insertion end can, e.g., comprise interlocking elements designed as special grooves that form an SDS plus interface or an SDS max interface. To machine a workpiece, the drilling tool is placed in a rotating as well as linearly oscillating or striking state by means of the hammer drill.

The drilling tool penetrates the workpiece during machining in the feeding direction of the drilling tool. The feeding direction of the drilling tool is coaxial to the longitudinal axis of the drilling tool and starting from the insertion end towards the drill head. In particular, the longitudinal axis of the drilling tool corresponds to a working or rotational axis of the drilling tool.

In this context, a drill head is in particular understood to mean a region of the drilling tool comprising at least one cutting body. The cutting edge comprises at least one cutting element, which can be designed as a main cutting element or an auxiliary cutting element. The cutting elements are in particular made of a carbide. Preferably, the cutting elements have a higher degree of hardness than the main body. Each cutting element comprises at least one cutting edge. The cutting edge corresponds to the intersection line of a cutting surface and a free surface of the cutting element. Preferably, each cutting element comprises a single cutting edge. Alternatively, the cutting element can also comprise a plurality of cutting edges, which in particular transition into one another. In particular, the region of the drill head is tensioned by the at least one cutting body. Preferably, the cutting body comprises at least two cutting elements, preferably at least four cutting elements. The connection between the cutting body and the drilling tool is in particular performed via a bonded connection. Preferably, the drill head is designed as a solid carbide head, in which case a single cutting body is connected to the main body with at least one cutting element via a blunt surface, preferably via a welded connection. Alternatively, it is also conceivable that the drilling tool comprises incisions in which the cutting body is inserted and in particular connected via a soldered connection. In this context, the weld joint differs from the solder joint in particular in that the weld joint is partially melted up of the components to be connected.

The transport channel is in particular designed to transport a fluid, preferably an air flow, within the drilling tool. The transport channel is preferably provided for the extraction of drill debris within a drill hole during a drilling operation. The drill debris is preferably transported in a direction contrary to the feeding direction of the drilling tool. The transport channel comprises a suction inlet and a suction outlet, the distance of which correspond to the length of the transport channel. The transport channel can be formed eccentrically or concentrically. An eccentric or concentric transport channel is to be understood in particular as a transport channel that runs at least 70% of its length, preferably at least 90% of its length, preferably substantially entirely along its length, eccentrically or concentrically to the longitudinal axis of the drilling tool. The drill debris can enter the transport channel via the suction inlet. Preferably, the drill head comprises at least one suction inlet. The suction inlet and the suction outlet can be located substantially parallel to each other, preferably substantially perpendicular to each other.

In addition, the drilling tool comprises a connecting region designed to connect the drilling tool to a suction removal adapter. The suction removal adapter is provided for particularly releasable connection of the drilling tool to a suction removal device.

In particular, the connecting region comprises at least one connecting element designed to connect the drilling tool to a suction removal adapter. Preferably, in the connected state, the suction removal adapter is designed to be partially movable with respect to the drilling tool, in particular movable with respect to the main body of the drilling tool. In particular, the suction removal adapter is axially fixed and rotatably connected such that the suction removal adapter is axially substantially fixed to the drilling tool and the drilling tool can rotate inside the suction removal adapter. In particular, the suction removal adapter is fixed to the drilling tool, with a clearance being provided. The suction outlet can be located in the connecting region. Preferably, the transport channel is partially located in the connection region.

The main body is preferably connected to the drill head, in particular to the cutting body, in a bonded manner. Preferably, the main body does not intersect the longitudinal axis of the drilling tool in the transport region. In particular, the main body axially adjoins the drill head or the cutting body at least partially, preferably completely. The main body is in particular designed to transfer an impact pulse from the hand-held tool machine to the drill head. The main body is made of a metallic material, in particular a steel. The main body is in particular rotationally connected to the insertion end. The main body can be designed to be integral with the insertion end.

The cover element is in particular designed to radially border one or multiple sides of the transport channel along the extension of the latter. The cover element can, e.g., be designed to be beam-shaped. The cover element can be made of a metallic material or a material that contains plastic. If the cover element is made of a metallic material, then the cover element can in particular be made of stainless steel, preferably C5CRNi18-10. Advantageously, effective resistance of the cover element to abrasion and corrosion can be achieved as a result. If the cover element is made of a plastic-containing material, then the cover element can be made of a thermoplastic or thermoset plastic, e.g., polyethylene, polypropylene, polyurethane, polyethylene terephthalate, polyamide, acrylonitrile butadiene styrene, polyether ketone, polytetrafluorethylene, etc. Advantageously, cover elements made of plastic have a particularly high corrosion resistance, in particular against salts. The cover element can be made of the same material as the main body.

The interior region of the cover element is located inside an enveloping curve of the main body, and the exterior region of the cover element is located outside the enveloping curve of the main body. The enveloping curve of the main body can be constant or variable along the transport channel. The enveloping curve is circular in shape, whereby a radius of the enveloping curve at the respective location corresponds to a maximum radius of the main body. The cover element can be connected to the main body in a bonded, frictional, and/or interlocking manner. The connection between the cover element and the main body preferably takes place in the interior region of the cover element.

It is further proposed that the exterior region of the cover element be designed as a cutting means for generating a drill hole. Advantageously, the shape of the drill hole can be optimized by the additional abrasive effect of the cover element.

It is further proposed that a distance of the cutting means of the cover element from the longitudinal axis of the drilling tool be at least 45%, in particular about 50%, of a diameter of the drill head. Alternatively, it is conceivable that the distance between the cutting means of the cover element and the longitudinal axis of the drilling tool will correspond to at least 46.5%, in particular at least 48%, preferably substantially the radius of the drill head. Advantageously, the shape of the drill hole can thereby be further adjusted.

In addition, it is proposed that the cutting means be designed to be pointed or blunt. The term "pointed cutting means" is in this context intended to mean that the edge includes an angle of less than 90°. The term "blunt cutting means" is in this context intended to mean that the cutting edge includes an angle of greater than 90°. The cutting means can be constant or variable along the extension of the cover element. Accordingly, it is also conceivable that the cutting means can be partially pointed and partially blunt. Advantageously, the shape of the drill hole and the service life of the cutting means can thereby be adjusted.

It is further proposed that the cover element comprises a single cutting means. Alternatively, it is also conceivable that the cover element comprises at least two cutting means. Advantageously, the shape of the drill hole can be optimally adjusted as a result.

It is further proposed that no interior region, only one interior region, or two interior regions be located adjacent the cutting means.

In addition, it is proposed that a ratio between the at least one exterior region and the at least one interior region in cross-section is in a range between 10 and 1/10, preferably between 5 and 1/2. Advantageously, a high service life of the cutting means of the cover element can thereby be achieved.

It is further proposed that a midpoint angle (μ) with the longitudinal axis of the drilling tool as the midpoint (M) and with the transition regions of the cutting means as the end points is less than 20°, preferably less than 10°, more preferably less than 5°. The transition regions of the cutting means correspond in this case to the regions where the exterior region transitions to the interior region.

It is further proposed that the cutting means be designed to be curved. In particular, the cover element has a smaller radius than the main body. In this context, it should be understood by curved means that the cover element has a substantially circular cross-section that has a substantially constant radius.

It is also proposed that the main body comprises a single transport channel. When viewed in cross-section, the transport channel preferably has a maximum height extending along a diameter of the main body and a maximum width extending perpendicular to the height, the maximum height being greater than the maximum width.

It is further proposed that the maximum height of the transport channel corresponds to at least 40%, preferably at least 50%, of the diameter of the main body. Advantageously, a high suction removal capacity can thereby be achieved.

In addition, it is proposed that the cover element has a width that is greater than a width of the transport channel when viewed in cross-section. Advantageously, a secure connection of the cover element to the main body can thereby be achieved.

BRIEF DESCRIPTION OF THE DRAWINGS

Further advantages follow from the description of the drawings hereinafter. The drawings, the description, and the claims contain numerous features in combination. The person skilled in the art will advantageously also consider the features individually and combine them in order to form further preferable combinations. Reference characters for features of various embodiments of the disclosure which substantially match are provided with the same numeral and with a letter identifying the embodiment.

Shown are:

FIG. 1*c* a longitudinal section of the drilling tool according to FIG. 1*a;*

DETAILED DESCRIPTION

Figure 1A:
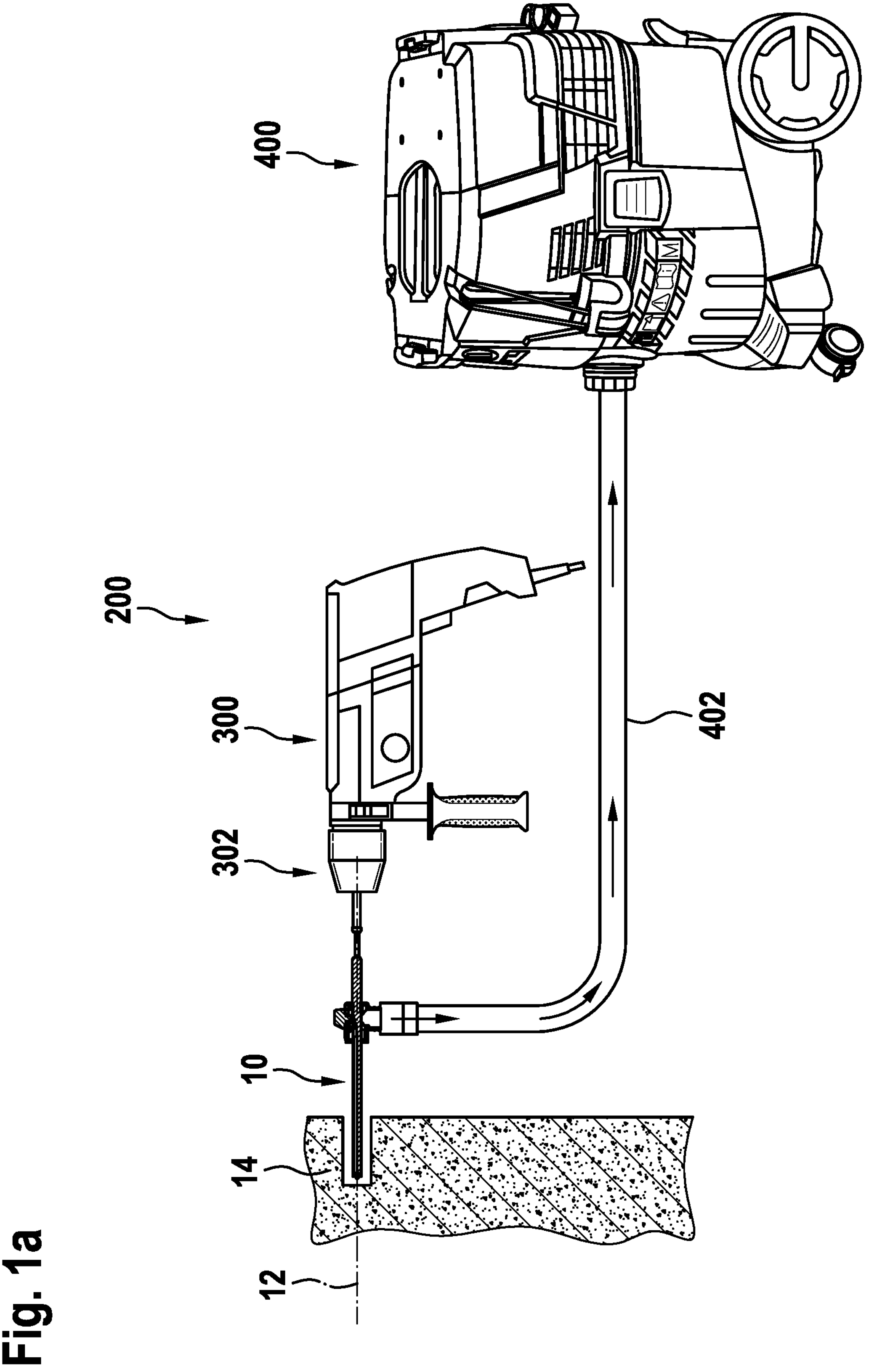
FIG. 1*a* a side view of a system consisting of a hand-held tool machine with a drilling tool connected to an suction removal device via a suction removal adapter.

A schematic view of a tool system 200 is shown in FIG. 1*a*. The tool system 200 comprises a drilling tool 10, a hand-held tool machine 300, and a suction removal device 400. The hand-held tool machine 300 is, e.g., designed as a hammer drill. The hand-held tool machine 300 comprises a tool receptacle 302 designed to receive an insertion tool designed as a drilling tool 10. The hand-held tool machine 300 comprises a power unit (not shown) and a transmission comprising a pneumatic percussion mechanism. The power unit and the transmission can be used to drive the drilling tool 10 in the coupled state rotationally about a longitudinal axis 12 of the drilling tool 10 and linearly oscillate or impact along the longitudinal axis 12.

Figure 1B:
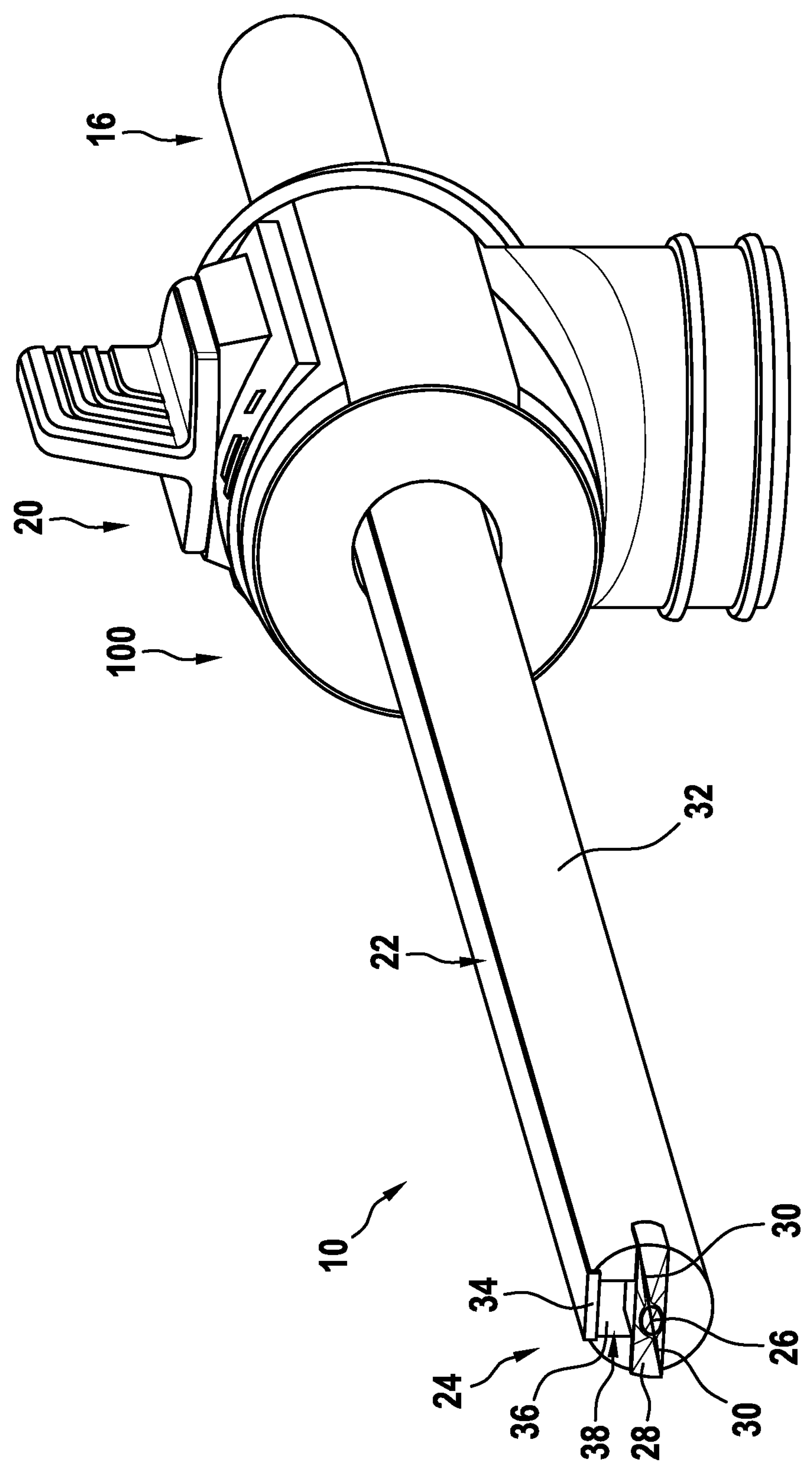
FIG. 1*b* a perspective view of the drilling tool according to FIG. 1*a;*
Figure 1C:
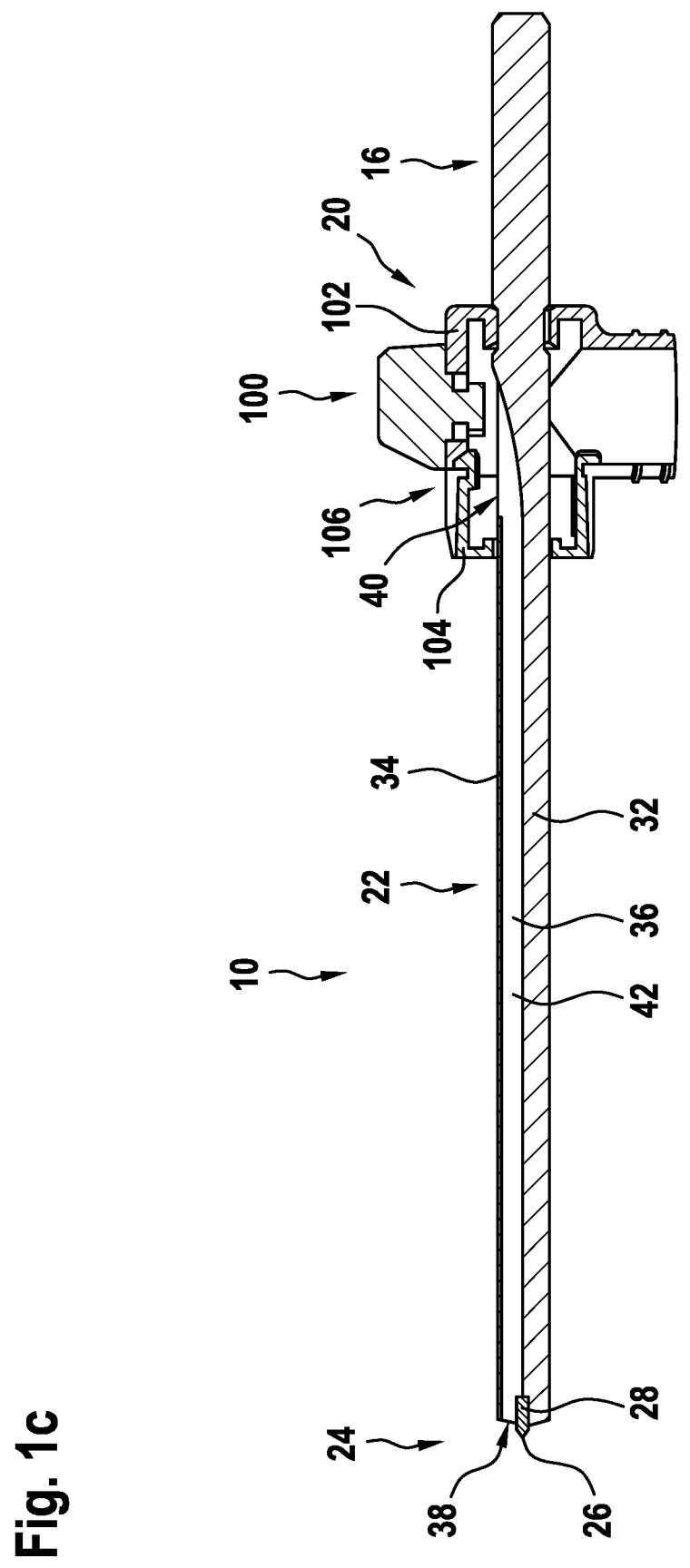

The drilling tool 10 is designed as a rock drill and is shown in an enlarged perspective view in FIG. 1*b*. The drilling tool 10 is in particular designed as a suction drill, via which dust and drill debris can be suctioned from the drill hole during the drilling operation. The drilling tool 10 is further shown in a longitudinal section in FIG. 1*c*. The drilling tool 10 is particularly provided to generate a drill hole in a workpiece 14, e.g., in the form of a wall. The drill hole is generated via a striking motion of the drilling tool 10 along the longitudinal axis 12 and a rotational motion of the drilling tool 10 about the longitudinal axis 12. The drilling tool 10 comprises an insertion end 16 designed to connect the drilling tool 10 to the hand-held tool machine 300. The insertion end 16 of the drilling tool 10 has, e.g., a larger diameter than the drill head 24.

The insertion end 16 is designed to be substantially cylindrical. The tool receptacle 302 of the hand-held tool machine 300 comprises jaws (not shown) connected to the insertion end 16 of the drilling tool 10 when connected. Alternatively, it is also conceivable that the insertion end 16 comprises interlocking elements, which are designed as elongate grooves and are associated with a standardized interface, e.g., SDS plus or SDS max. Starting from the insertion end 16, the drilling tool 10 comprises a connection region 20 along its longitudinal extension for connecting the drilling tool 10 to a suction removal adapter 100, a transport region 22, and a drill head 24. The front end of the drilling tool 10 is formed by the drill head 24, and the rear end of the drilling tool 10 is formed by the insertion end 16.

The suction removal adapter 100 is connected to the suction removal device 400 (designed, e.g., as an industrial vacuum) via a suction hose 402. The suction removal adapter 100 is formed in multiple pieces and comprises a first housing member 102 and a second housing member 104 interconnected via a housing interface 106. The suction removal adapter 100 and the drilling tool 10 are rotatably connected in relation to each other.

The drill head 24 comprises a single cutting body 28 in the form of a carbide plate. The cutting body 28 is inserted into and soldered to an incision of a main body 32 of the drilling tool 10. The cutting body 28 comprises two cutting elements 30, in particular two main cutting elements. The cutting body 28 is designed to be integral. The drill head 24 comprises a tip 26 formed as a centering tip, the front face of which projects such that it first comes into contact with the workpiece 14. The drilling tool 10 comprises a main body 32 and a cover element 34 in the transport region 22. Radially located between the main body 32 and the cover element 34 is a transport channel 36 for transporting drill debris from the drill hole. The transport channel 36 extends along the longitudinal axis 12 completely through the transport region 22. The transport channel 36 comprises a suction inlet 38, through which drill debris enters the transport channel 36 during the generation of the drill debris, and a suction outlet 40, through which the drill debris exits the transport channel 36. The suction outlet 40 is in this case located inside the suction removal adapter 100. The drilling tool 10 comprises, e.g., a single transport channel 36. However, it would also be conceivable for the drilling tool 10 to comprise a plurality of transport channels.

The main body 32 comprises an external groove 42, which extends in a straight line and parallel to the longitudinal axis 12 through the transport region 22. As an alternative, it would also be conceivable for the single external groove 42 to extend helically around the longitudinal axis 12 through the transport region 22. In this case, the cover element 34 would have to be adjusted accordingly. The groove 42 is formed axially open at its end facing the drill head 24, at its end facing away from the drill head 24, the groove 42 is formed axially closed and open radially outward. Radially, the groove 42 in the transport region 22 is closed by the cover element 34 such that the transport channel 36 in the transport region 22 is closed in the circumferential direction. The cover element 34 is fixedly connected to the main body 32, for example via a cloth closure in the form of a soldered connection. The cover element 34 is shaped such that a cross-sectional surface 43 of the transport channel 36 in the transport region 22 is substantially constant. In other words, the profile of the transport channel 36 has a substantially straight median line. More particularly, the median line is formed substantially along the entire transport channel 36, preferably between the suction inlet 38 and the suction outlet 40 in a substantially straight line.

Figure 1D:
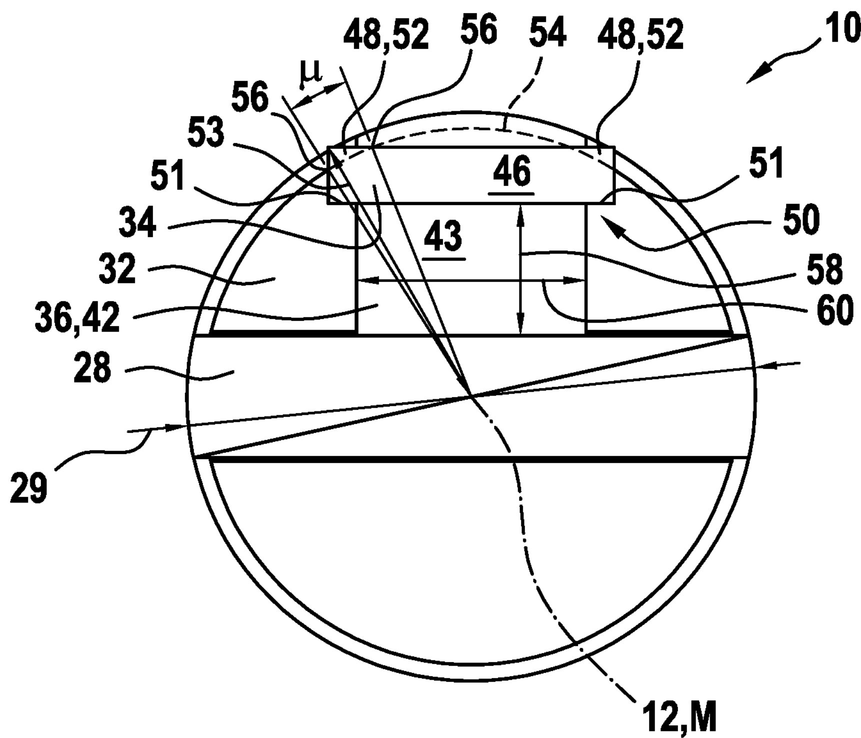
FIG. 1*d* a top view of the drilling tool according to FIG. 1*a* without the suction removal adapter.

In FIG. 1*d*, drilling tool 10 is shown in an overhead view. The cover element 34 is, e.g., designed in a beam-shaped manner with a rectangular cross-section.

The cover element 34 comprises an interior region 46 located inside the main body 32 and two exterior regions 48 located outside the main body 32.

The groove 42 of the main body 32 has a substantially rectangular cross-section, which extends over steps 50 in the region of the cover element 34. The steps 50 in this case form a support surface 51, on which the cover element 34 rests. The two support surfaces 51 are in this case substantially the same size, so the cover element 34 rests centrally. The region of the groove 42 bounded by the main body 32 and the cover element 34 forms a cavity and corresponds to the transport channel 36.

The interior region 46 of the cover element 34 is located in the groove 42. The exterior regions 48 of the cover element 34 are located outside of the groove 42 and each form a cutting means 52. The cutting means 52 of the cover element 34 extend beyond an enveloping curve 54 of the main body 32 (indicated by a dotted line).

The cutting means 52 are located at a distance 53 from the longitudinal axis 12 of the drilling tool 10 that substantially corresponds to a maximum diameter 29 of the drill head 24, in particular the cutting body 28.

In addition, the cutting means 52 each have a midpoint angle μ with the longitudinal axis 12 of the drilling tool 10 acting as the midpoint M and with the transition regions 56 of the cutting means 52 acting as the end points, where p is less than 20°. The transition regions 56 thereby laterally border the cutting means 52 or the exterior region 48 of the cover element 34. The cutting means 52 have an angle of, e.g., 90°. Alternatively, it would also be conceivable that the cutting means 52 be pointed or blunt.

When viewed in cross-section, the transport channel 36 has a maximum height 58 and a maximum width 60, wherein the maximum height 58 is by way of example less than the maximum width 60.

Figure 2:
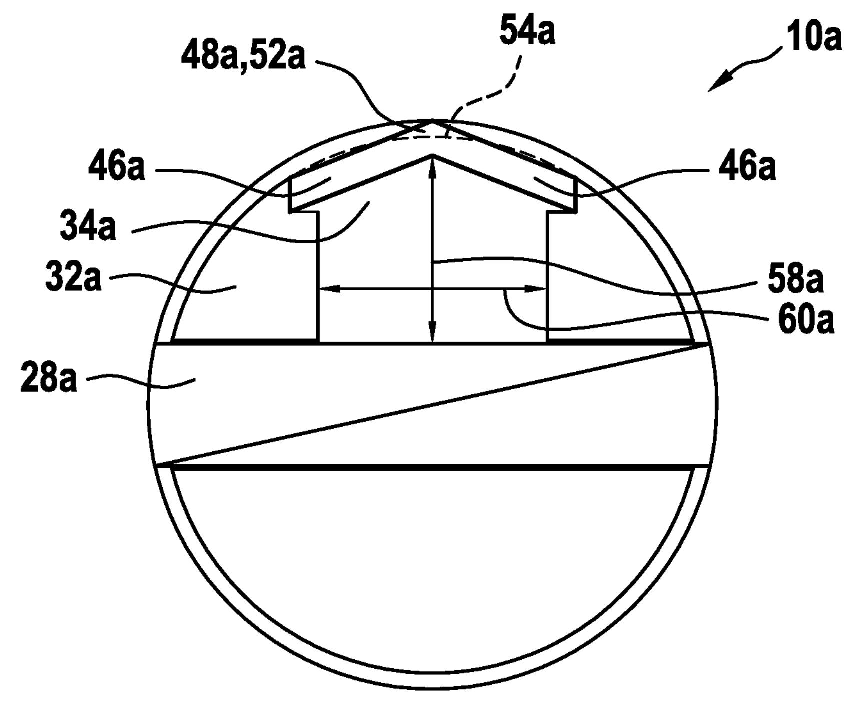
FIG. 2 a top view of an alternative embodiment of a drilling tool.

A top view of an alternative embodiment of the drilling tool 10 is shown in FIG. 2. The drilling tool 10*a* in this case differs in particular in the design of the cover element 34*a*.

The cover element 34*a* has a roof-shaped cross-section with a single exterior region 48*a* located adjacent to two interior regions 46*a*. The exterior region 48*a* in this case forms a cutting means 52*a*. The cutting means 52*a* is, e.g., located centrally between the two interior regions 48*a*. By way of example, the cutting means 52*a* is blunt and has an angle of greater than 90°.

Given the shape of the cover element 34*a*, the transport channel 36*a* has a maximum height 58*a* and a maximum width 60*a* when viewed in cross-section, the maximum height 60 being greater than the maximum width 60.

Figure 3:
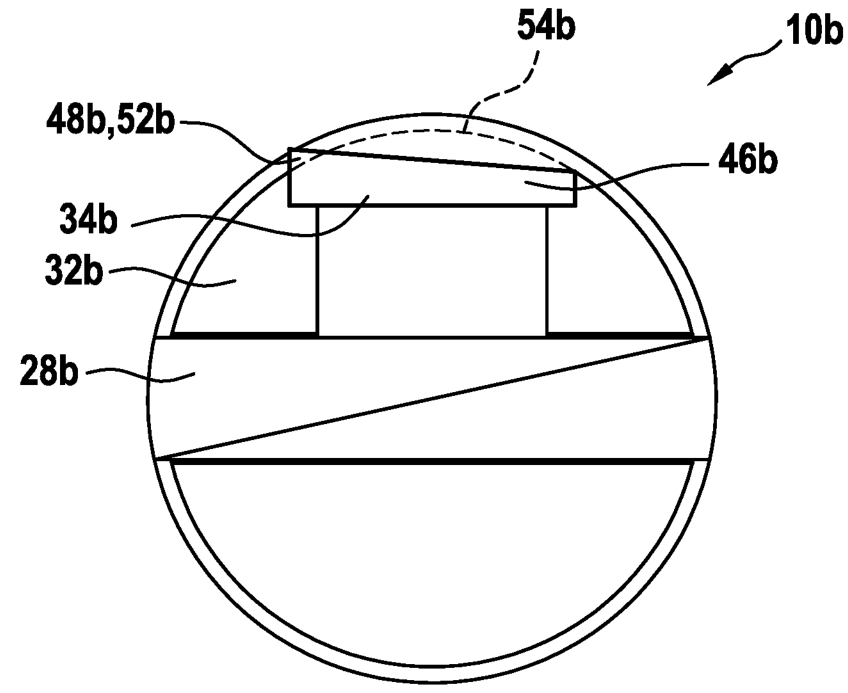
FIG. 3 a top view of a further alternative embodiment of a drilling tool.

A top view of a further alternative embodiment of the drilling tool 10 is shown in FIG. 3. The drilling tool 10*b* in this case differs in particular in the design of the cover element 34*b*.

The cover element 34*b* has a cross-section with a single exterior region 48*b* and a single interior region 46*b*. The exterior region 48*b* in this case forms the cutting means 52*b*. The cutting means 52*b* is, e.g., located at the left end of the cover element 34*b*. The cutting means 52*b* is, e.g., pointed and has an angle of less than 90°.

Figure 4:
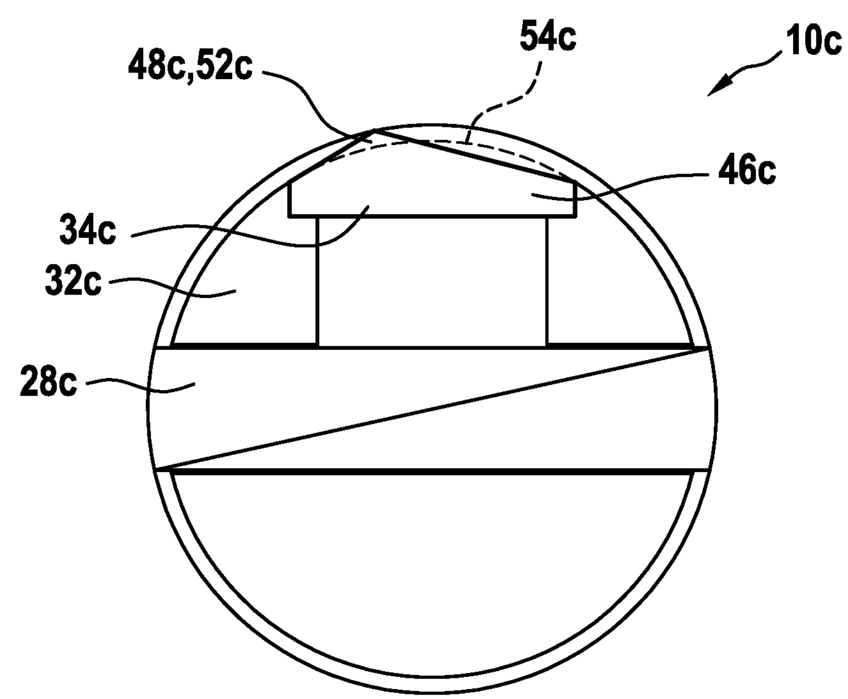
FIG. 4 a top view of a further alternative embodiment of a drilling tool.

A top view of a further alternative embodiment of the drilling tool 10 is shown in FIG. 4. The drilling tool 10*c* in this case differs in particular in the design of the cover element 34*c*.

The cover element 34*c* has a cross-section with a single exterior region 48*c* and a single interior region 46*c*. Unlike in FIG. 3, the cutting means 52*c* is not located on the edge. The exterior region 48*a* forms the cutting means 52*c*. The cutting means 52*c* is off-centered and is designed to be blunt.

Figure 5:
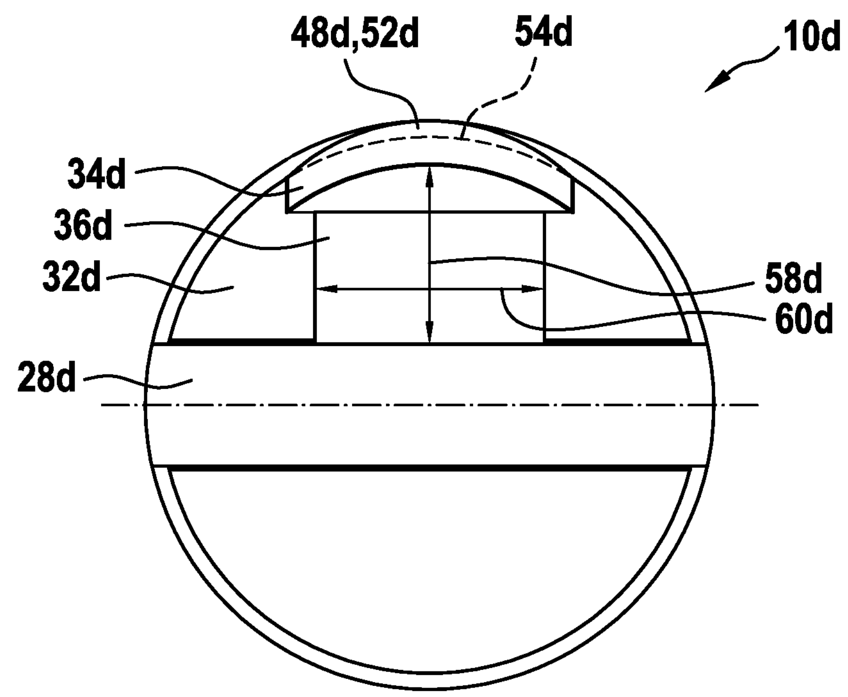
FIG. 5 a top view of a further alternative embodiment of a drilling tool.

A top view of a further alternative embodiment of the drilling tool 10 is shown in FIG. 5. The drilling tool 10*d* in this case differs in particular in the design of the cover element 34*d*.

The cover element 34*d* has a curved cross-section with a single, exterior region 48*d*. The cover element 34*d* does not, e.g., have an interior region such that it acts as a cutting means 52*d* over the entire width of the cover element 34*d*.

The cover element 34*d* has a circular cross-section, the radius of curvature of the cover element 34*d* being smaller than the outer diameter of the main body 32*d* in the region of the cover element 34*d*.

Given the shape of the cover element 34*d*, the transport channel 36*d* has a maximum height 58*d* and a maximum width 60*d* when viewed in cross-section, the maximum height 60*d* being greater than the maximum width 60*d*.

Figure 6:
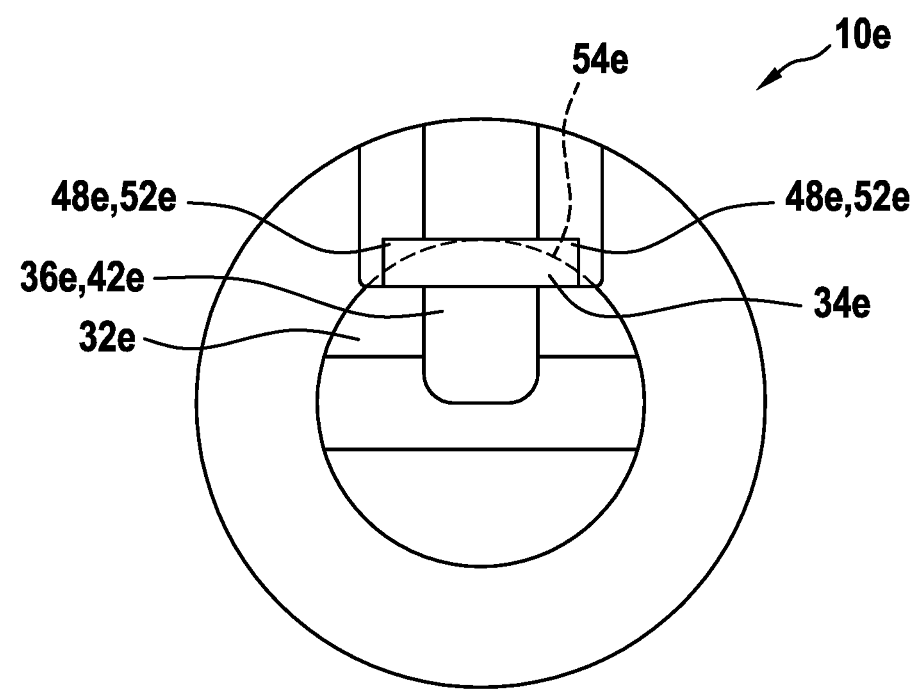
FIG. 6 a top view of a further alternative embodiment of a drilling tool.

A top view of another embodiment of the drilling tool 10 is shown in FIG. 6 (cutting body not shown). The groove 42*e* forming the transport channel 36*e* projects into the main body 32*e* up to the longitudinal axis 12*e* of the drilling tool 10*e*. The height of the groove 42*e* therefore substantially corresponds to the radius of the main body 32*e*.

The cover element 34*e* is beam-shaped and comprises two exterior regions 48*e* that project beyond the enveloping curve 54*e*. The two exterior regions 48*e* in this case each form cutting means 52*e*, which are located adjacent to each other. No interior region is, e.g., located between the two cutting means 52*e* such that the cutting means merge into one another in a region in which the cover element 34*e* substantially lies on the enveloping curve 54*e*.

Figure 7:
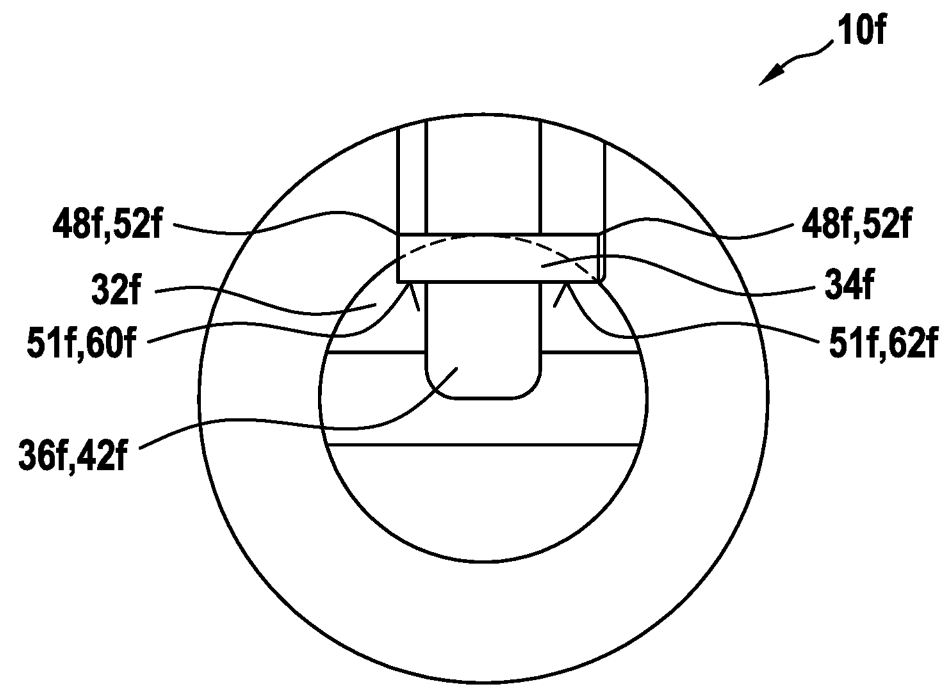
FIG. 7 a top view of a further alternative embodiment of a drilling tool.

FIG. 7 shows a top view of another embodiment of drilling tool 10 (cutting body not shown).

The cover element 34*f* is beam-shaped and adjoins two support surfaces 51*f* on the main body 32*f* of the drilling tool 10*f*. The first support surface 60*f* is in this case designed to be smaller than the second support surface 62*f*. The cover element 34*f* is therefore not centrally located with respect to the groove 42*f* or the transport channel 36*f*, but rather at an offset.

The result is two exterior regions 48*f* forming cutting means 52*f*, in which case cutting means 52*f* is smaller than cutting means 52*f* over the second supporting surface 60*f* above the first support surface 60*f*.

Figure 8:
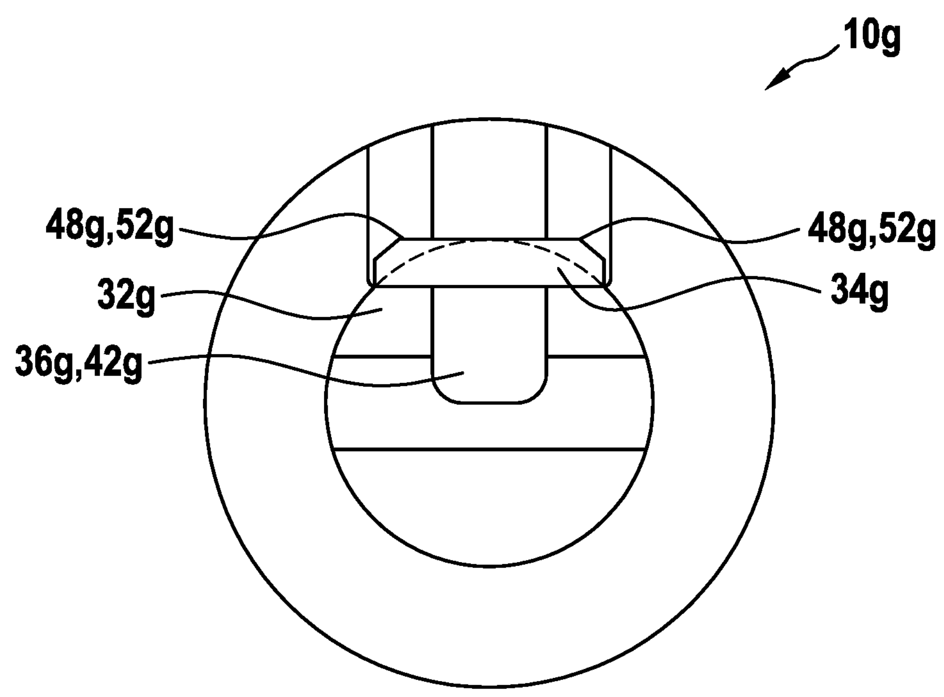
FIG. 8 a top view of a further alternative embodiment of a drilling tool.

FIG. 8 shows a top view of another embodiment of drilling tool 10, with the cutting body not shown.

The cover element 34*g* of the drilling tool 10*g* features a rectangular base shape with two beveled edges in the region of the cutting means 52*g*.

The invention claimed is:

1. A drilling tool, that extends along a longitudinal axis, the drilling tool comprising:

a drill head;

an insertion end;

a main body;

a cover element comprising at least one exterior region located outside the main body;

a transport region located between the drill head and the insertion end; and at least one transport channel extending along the transport region, the at least one transport channel located radially between the cover element and the main body, wherein the cover element comprises at least one interior region located inside the main body.

2. The drilling tool according to claim 1, wherein the at least one exterior region of the cover element includes a cutter configured to generate a drill hole.

3. The drilling tool according to claim 2, wherein a distance of the cutter from the longitudinal axis corresponds to at least 45% of a diameter of the drill head.

4. The drilling tool according to claim 2, wherein the cutter is pointed or blunt.

5. The drilling tool according to claim 2, wherein the cover element comprises a single cutter.

6. The drilling tool according to claim 2, wherein the cover element comprises at least two cutters.

7. The drilling tool according to claim 2, wherein one interior region is, or two interior regions are, located adjacent the cutter.

8. The drilling tool according to claim 2, wherein a midpoint angle with the longitudinal axis of the drilling tool acting as a midpoint and with transition regions of the cutter acting as endpoints is less than 20°.

9. The drilling tool according to claim 2, wherein:

the cutter is curved, and the cover element has a smaller radius than the main body.

10. The drilling tool according to claim 1, wherein a ratio between the at least one exterior region and the at least one interior region in cross-section is in a range between 10 and 1/10.

11. The drilling tool according to claim 1, wherein the at least one transport channel includes only a single transport channel.

12. The drilling tool according to claim 1, wherein the cover element has a width greater than a width of the at least one transport channel in cross-section.

13. The drilling tool according to claim 1, wherein:

the at least one transport channel in cross-section has a maximum height extending along a diameter of the main body and a maximum width extending perpendicular to the diameter of the main body, and the maximum height is greater than the maximum width.

14. The drilling tool according to claim 13, wherein the maximum height of the at least one transport channel corresponds to at least 40% of the diameter of the main body.

15. A drilling tool, that extends along a longitudinal axis, the drilling tool comprising:

a drill head;

an insertion end;

a main body;

a cover element comprising at least one exterior region located outside the main body;

a transport region located between the drill head and the insertion end; and at least one transport channel extending along the transport region, the at least one transport channel located radially between the cover element and the main body, wherein:

the at least one transport channel in cross-section has a maximum height extending along a diameter of the main body and a maximum width extending perpendicular to the diameter of the main body, and the maximum height is greater than the maximum width.

16. The drilling tool according to claim 15, wherein the maximum height of the at least one transport channel corresponds to at least 40% of the diameter of the main body.

* * * * *